F. J. & C. T. BOSSERT.
VINE CUTTER.
APPLICATION FILED JUNE 7, 1917.

1,265,296.

Patented May 7, 1918.

Inventors
F. J. Bossert
C. T. Bossert,
By C. L. Parker
Attorney

UNITED STATES PATENT OFFICE.

FRED J. BOSSERT AND CHARLES T. BOSSERT, OF SELMA, CALIFORNIA.

VINE-CUTTER.

1,265,296.  Specification of Letters Patent.  Patented May 7, 1918.

Application filed June 7, 1917. Serial No. 173,293.

*To all whom it may concern:*

Be it known that we, FRED J. BOSSERT and CHARLES T. BOSSERT, citizens of the United States, residing at Selma, in the county of Fresno and State of California, have invented certain new and useful Improvements in Vine-Cutters, of which the following is a specification.

This invention relates to a device for clipping or cutting fruit, or the like, such as bunches of grapes, from the vine, and has particular reference to such a device which is adapted to be securely attached to the hand or fingers thereof, and may be conveniently employed in clipping or cutting the vine, while leaving the fingers free for holding the bunches of grapes or other fruit, while the device may be advantageously used for other purposes, such as in cutting twine, or the like, employed for different purposes.

An important object of the invention is to provide a device of the above mentioned character, which is simple in construction, inexpensive to manufacture, and expeditious and convenient in use.

Other objects and advantages of the invention will be apparent during the course of the following description.

Figure 1:
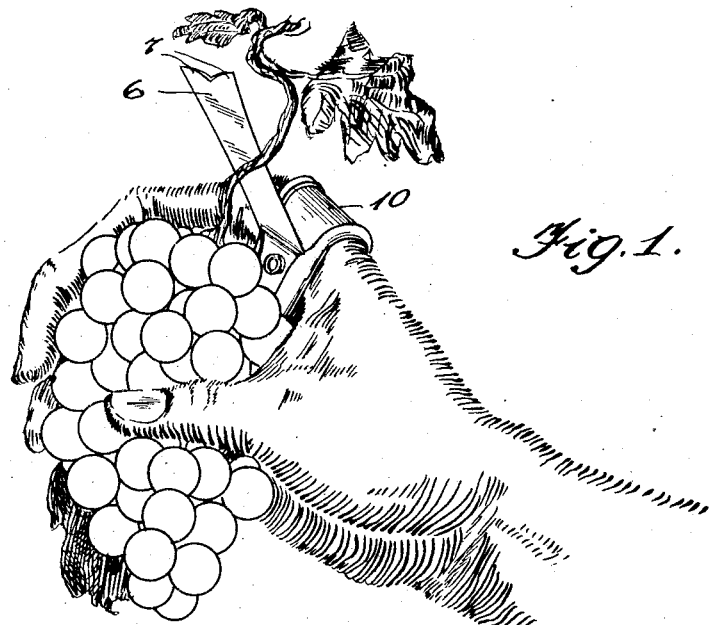
Figures 2, 3, 4, 5:
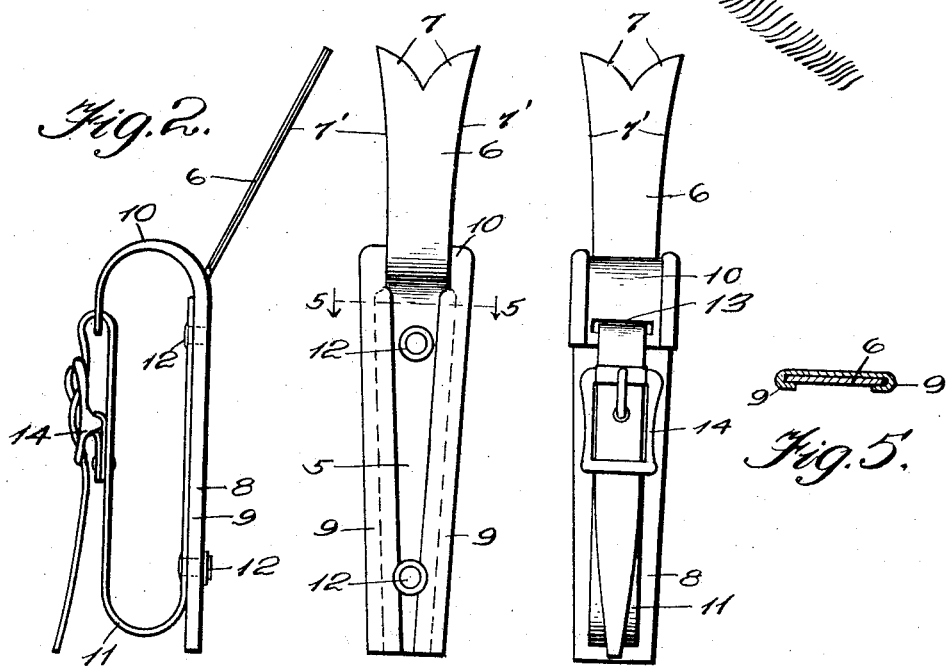

In the accompanying drawings forming a part of this specification and in which like numerals are employed to designate like parts throughout the same, Figure 1 is a perspective view of a device embodying our invention, showing the same in use, Fig. 2 is an edge elevation of the same, Fig. 3 is an elevation of the front side of the device, Fig. 4 is a similar view of the rear side, and, Fig. 5 is a horizontal sectional view taken on line 5—5 of Fig. 4.

The device comprises a rigid shank 5, carrying at its upper end a blade 6, preferably rigidly secured thereto and formed integral therewith. The blade 6 is preferably disposed at an angle of about 30° to the shank 5, and extends forwardly, as shown, while this angular arrangement may be widely varied.

The blade 6 has its forward end preferably forked, providing a V-shaped opening, forming angularly arranged edges 7, which are preferably blunt and constitute noncutting edges, but may be advantageously employed in removing or separating the vine to be cut from the associated vines. The cutting of the vine is accomplished by oppositely arranged longitudinal cutting edges 7', which extend from the upper end of the shank 5 to the outer ends of the blunt edges 7.

The numeral 8 designates a preferably rigid metallic guard or holding member, preferably formed of a section of sheet metal, having longitudinal flanges 9 bent or formed thereon. The shank 5 is arranged within and between portions of the flanges 9 and is thereby secured to the guard 8. The flanges 9 continue upwardly and outwardly beyond the shank 5, and serve to reinforce and stiffen the upper curved portion 10 of the guard.

The numeral 11 designates a flexible strap, a portion of which is in contact with the inner side of the guard 8, and is attached thereto by means of rivets 12, passing through this guard and through the shank 5. The free end of the flexible strap 11 is passed through an opening or slot 13, formed in the free end of the guard 8. This free end of the strap is adapted for engagement with a buckle 14, carried by the strap 11.

In the use of the device, the guard 8 and strap 11 are placed upon and about the fingers, preferably near the palm of the hand. The strap 11 may be readily adjusted by manipulation of the buckle 14, so that the device may be firmly retained in place upon the fingers. It is thus apparent that the fingers are wholly free to grasp or hold bunches of grapes or the like, before and after cutting of the vine, whereby the same may be conveniently transferred to a sack or other suitable receptacle. The cutting of the vine is accomplished by bringing the same in contact with either longitudinal cutting edge 7'. The forked end of the blade 6 may be employed in separating the vine to be cut from the associated vines, and in doing this the vine within the V-shaped opening may be placed under suitable tension, and by proper manipulation of the device, may be made to travel along the blunt noncutting edge 7, and conducted thereby to the cutting edge 7', at which time the same is instantly severed. By having the edges 7 blunt, the device may be employed in separating out vines or the like, which it is not desired to cut or injure.

It is to be understood that the form of our invention herewith shown and described is to be taken as a preferred example of the same, and that various changes in the shape, size, and arrangement of parts may be resorted to without departing from the spirit of the invention or the scope of the subjoined claim.

Having thus described our invention, we claim:

A device of the character described, comprising a relatively rigid handle portion to be disposed upon the inner side of the hand of the user and allowing the fingers to remain free for use, said handle portion comprising a section of sheet metal having its upper end bent into a downwardly curved hook to straddle the upper portion of the hand, the longitudinal edges of the sheet metal being bent outwardly upon themselves providing reinforcing and holding flanges, the downwardly bent hook being provided at its free end with an opening; a shank arranged upon one side of the handle portion between it and the holding flanges and carrying at its upper end a forwardly projecting inclined blade, said blade being forked at its upper end and having upwardly diverging blunt edges forming a substantially V-shaped opening therebetween and longitudinal cutting edges terminating at the outer ends of the blunt edges; a flexible strap arranged upon the opposite side of the handle portion and passed through the opening in the hook; and devices to bind the strap, handle portion, and shank together.

In testimony whereof we affix our signatures in presence of witnesses.

FRED J. BOSSERT.
CHARLES T. BOSSERT.

Witnesses:
R. S. LEEMAN,
S. R. FRIZELLE,
P. H. LOHMAN,
JOEL H. SMITH.

Copies of this patent may be obtained for five cents each, by addressing the "Commissioner of Patents, Washington, D. C."